(12) United States Patent
Oltchik et al.

(10) Patent No.: US 11,973,694 B1
(45) Date of Patent: Apr. 30, 2024

(54) AD-HOC ALLOCATION OF IN-NETWORK COMPUTE-RESOURCES

(71) Applicant: MELLANOX TECHNOLOGIES, LTD., Yokneam (IL)

(72) Inventors: Yishai Oltchik, Givatayim (IL); Gil Bloch, Zichron Yaakov (IL); Daniel Klein, Tel-Aviv (IL); Tamir Ronen, Pardes Hanna-Karkur (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/192,688

(22) Filed: Mar. 30, 2023

(51) Int. Cl.
*H04L 47/76* (2022.01)
*H04L 47/70* (2022.01)

(52) U.S. Cl.
CPC ............ *H04L 47/76* (2013.01); *H04L 47/829* (2013.01)

(58) Field of Classification Search
None
See application file for complete search history.

(56) References Cited

U.S. PATENT DOCUMENTS

| | | | |
|---|---|---|---|
| 10,284,383 B2* | 5/2019 | Bloch | H04L 12/44 |
| 10,419,329 B2 | 9/2019 | Levi et al. | |
| 11,252,027 B2 | 2/2022 | Ben-Moshe et al. | |
| 2013/0174172 A1* | 7/2013 | Naga | G06F 9/4881 |
| | | | 718/103 |
| 2013/0219407 A1* | 8/2013 | Weinman, Jr. | G06F 9/4843 |
| | | | 718/105 |
| 2017/0139754 A1* | 5/2017 | Moreno | G06F 9/5038 |
| 2017/0155706 A1* | 6/2017 | Hiltunen | H04L 43/045 |
| 2020/0106828 A1 | 4/2020 | Elias et al. | |
| 2020/0250137 A1* | 8/2020 | Rajawat | H04L 67/1097 |
| 2021/0058453 A1* | 2/2021 | Balasubramanian | H04L 67/101 |
| 2023/0164080 A1* | 5/2023 | Du | H04L 47/125 |
| | | | 370/230.1 |

FOREIGN PATENT DOCUMENTS

| | | | |
|---|---|---|---|
| EP | 3203374 B1 * | 11/2021 | G06F 9/4881 |
| WO | 2022254253 A2 | 12/2022 | |

OTHER PUBLICATIONS

Nvidia Corporation, "Nvidia Scalable Hierarchical Aggregation and Reduction Protocol (SHARP)™," Product Information, Rev. 2.0.0, pp. 1-32, year 2023, as downloaded from https://docs.nvidia.com/networking/display/SHARPv200.

* cited by examiner

*Primary Examiner* — Brian Whipple
(74) *Attorney, Agent, or Firm* — KLIGLER & ASSOCIATES PATENT ATTORNEYS LTD.

(57) ABSTRACT

In one embodiment, an in-network compute resource assignment system includes a network device to receive a request to select resources to perform a processing job, wherein the request includes at least one resource requirement of the processing job, and end point devices assigned to perform the processing job, a memory to store a state of in-network compute-resources indicating resource usage of the in-network compute-resources by other processing jobs, and a processor to manage the stored state, and responsively to receiving the request, selecting ones of the in-network compute-resources to perform the processing job based on: (a) a network topology of a network including the in-network compute-resources; (b) the state of the in-network compute-resources; and (c) the at least one resource requirement of the processing job.

22 Claims, 4 Drawing Sheets

AD-HOC ALLOCATION OF IN-NETWORK COMPUTE-RESOURCES

FIELD OF THE INVENTION

The present invention relates to computer systems, and in particular, but not exclusively, to allocation of in-network compute-resources.

BACKGROUND

A network node (e.g., including any suitable element(s) such as a graphics processing unit (GPU) and/or a central processing unit (CPU)) may initiate a parallel computing job with other GPUs across a network. In addition to the other GPUs participating in the parallel computing job, compute-resources in switches in the network may also participate in the parallel computing job by providing the various GPUs with the necessary data to perform the parallel computing job and also by performing such tasks as addition. The switches may perform reduction processing (e.g., summing two numbers together) and aggregation of data received from other network switches and/or GPUs.

An example of reduction and aggregation is provided in U.S. Pat. No. 10,284,383 to Bloch, et al., which describes a switch in a data network configured to mediate data exchanges among network elements. The apparatus further includes a processor, which organizes the network elements into a hierarchical tree having a root node network element, vertex node network elements, and child node network elements that include leaf node network elements. The leaf node network elements originate aggregation data and transmit the aggregation data to respective parent vertex node network elements. The vertex node network elements combine the aggregation data from at least a portion of the child node network elements, and transmit the combined aggregation data from the vertex node network elements to parent vertex node network elements. The root node network element is operative for initiating a reduction operation on the aggregation data.

SUMMARY

There is provided in accordance with an embodiment of the present disclosure, a system, including a network interface to receive a request to select resources to perform a processing job, wherein the request includes at least one resource requirement of the processing job, and end point devices assigned to perform the processing job, a memory to store a state of in-network compute-resources indicating resource usage of the in-network compute-resources by other processing jobs, and a processor to manage the stored state, and responsively to receiving the request, select ones of the in-network compute-resources to perform the processing job based on (a) a network topology of a network including the in-network compute-resources, (b) the state of the in-network compute-resources, and (c) the at least one resource requirement of the processing job.

Further in accordance with an embodiment of the present disclosure the request is generated by a job scheduler, or a software application, which is a user application.

Still further in accordance with an embodiment of the present disclosure the processor is to select the ones of the in-network compute-resources without selecting from a selection of in-network compute resource trees generated prior to receiving the request.

Additionally in accordance with an embodiment of the present disclosure the processor is to select the ones of the in-network compute-resources without selecting a tree of in network compute-resources from a selection of in-network compute resource trees generated prior to receiving the request.

Moreover, in accordance with an embodiment of the present disclosure the processor is to select the ones of the in-network compute-resources without pruning a tree of in-network compute-resources generated prior to receiving the request.

Further in accordance with an embodiment of the present disclosure the processor is to select the ones of the in-network compute-resources without pruning a selection of in-network compute-resources.

Still further in accordance with an embodiment of the present disclosure the in-network compute-resources are included in network switches connected the network topology, and the processor is to select ones of the network switches to perform the processing job based on the network topology, a state of the network switches, and the at least one resource requirement of the processing job.

Additionally in accordance with an embodiment of the present disclosure the processor is to select a tree of the selected network switches and network connections between the selected network switches.

Moreover, in accordance with an embodiment of the present disclosure the processor is to select of a given one of the network switches based on at least one other processing job that the given network switch is currently processing.

Further in accordance with an embodiment of the present disclosure the processor is to select a given one of the network switches based on comparing any one or more of the following a bandwidth resource of the given network switch and bandwidth requirements of the at least one other processing job that the given network switch is currently processing and the processing job, a latency of the given network switch and latency requirements of the at least one other processing job that the given network switch is currently processing and the processing job, a free buffer size of the given network switch and buffering requirements of the at least one other processing job that the given network switch is currently processing and the processing job, a radix of the given network switch and radix requirements of the processing job, and computational functions of the given network switch and computational requirements of the processing job.

Still further in accordance with an embodiment of the present disclosure the processor is to select a given one of the network switches based on a placement in the network of the given network switch.

Additionally in accordance with an embodiment of the present disclosure the processor is to select a given one of the network switches based on the given network switch not currently processing any other reduction processes.

Moreover, in accordance with an embodiment of the present disclosure the processor is to select ingress ports of the selected network switches through which to ingress packets of the processing job.

Further in accordance with an embodiment of the present disclosure the processor is to select a given ingress port of one of the selected network switches through which to ingress packets of the processing job based on at least one other processing job that the given ingress port is currently supporting.

Still further in accordance with an embodiment of the present disclosure the processor is to select the selected network switches based on a number of network connections between the selected network switches.

Additionally in accordance with an embodiment of the present disclosure the end point devices include graphics processing units assigned to perform part of the processing job.

Moreover, in accordance with an embodiment of the present disclosure the at least one resource requirement of the processing job includes one or more of the following a radix requirement of the selected in-network compute-resources, a height of a tree of the selected in-network compute-resources, a number of aggregation nodes, a bandwidth requirement, a latency requirement, a buffer space requirement, a type of computation to be performed, and computing floating point numbers.

Further in accordance with an embodiment of the present disclosure the processing job is a reduction and aggregation process in which the selected in-network compute-resources perform respective parts of the reduction and aggregation process.

Still further in accordance with an embodiment of the present disclosure the processor is to select the selected in-network compute-resources based on requirements of a reduction and aggregation protocol.

Additionally in accordance with an embodiment of the present disclosure the processor is to update the state of the in-network compute-resources responsively to receiving the request to select resources to perform the processing job, and completion of the processing job.

Moreover, in accordance with an embodiment of the present disclosure the state indicates any one or more of the following usage of ingress ports by processing jobs, use of switch bandwidth by processing jobs, switch compute resource latency, use of switch compute resource processing power by processing jobs, and use of switch buffers by processing jobs, and the processor is to select the selected in-network compute-resources based on the state of the in-network compute-resources and any one or more of the following usage of ingress ports by processing jobs, use of switch bandwidth by processing jobs, switch compute resource latency, use of switch compute resource processing power by processing jobs, and use of switch buffers by processing jobs.

Further in accordance with an embodiment of the present disclosure the processing job is a multicast process in which the selected in-network compute-resources perform respective parts of the multicast process.

There is also provided in accordance with another embodiment of the present disclosure, a method, including receiving a request to select resources to perform a processing job, the request including at least one resource requirement of the processing job, and end point devices assigned to perform the processing job, managing a state of in-network compute-resources indicating resource usage of the in-network compute-resources by other processing jobs, and responsively to receiving the request, selecting ones of the in-network compute-resources to perform the processing job based on a network topology of a network including the in-network compute-resources, the state of the in-network compute-resources, and the at least one resource requirement of the processing job.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Parallel computing applications are allocated network resources by a central administration node. For example, a parallel computing application may include a number of GPUs sending data to a network to be processed e.g., summed, by different switches across the network. For a given user job, which uses a number of endpoints in a datacenter, a tree of network switches is selected which spans the endpoints and allows the switches in the tree to participate in computation or other processing. The number of possible trees is enormous and may be in the millions or billions and it is therefore impossible to precompute all of them.

One solution is to generate a smaller number (e.g., 50 or 100) of possible trees from which one of the trees may be selected for a given user job. Each tree defines the switches in the tree and the connections to be used between the switches. The selected tree is optionally pruned to find the best selection of switches from the selected pre-generated tree. Pruning may be performed based on the switches which are not needed for the job. For example, a spanning tree is typically chosen from the switches above the end points participating in the job. The selected, optionally pruned tree, defines the switches (and ingress ports) that will be used for a parallel computing application and the ingress ports which will be used. Selecting the ingress ports is important to provide ingress port exclusivity for the distributed computations, if required. For example, a switch may perform 5 reductions operations at the same time as long as the different reduction operations use different ingress ports of the switch.

On drawback of the above solution is that there are a very small number of trees to choose from, and most of them may not work for a particular job. Some reasons that the pre-computed trees may not work may be due to overlap with other jobs, not in correct location of endpoints, network problems, available switches lack resources required for the job etc. Therefore, in many cases a user application may be denied a request for a suitable tree to perform a given job because the pool of pre-generated trees is too small and failed to include a suitable tree; had the pool been able to contain all possible combinations of trees, the application's request would be granted and not denied.

Therefore, embodiments of the present invention provide an in-network compute-resource allocation system which selects in-network compute-resources (e.g., in switches) from a selection of in-network compute-resources in an ad-hoc manner, in response to receiving a request from a software application (e.g., a user application) to select resources to perform a processing job. The in-network compute-resources are selected based on a topology of the network, a state of the in-network compute-resources, resource requirement(s) of the processing job, and the endpoint devices assigned to perform the processing job. In some embodiments, a tree of switches is selected (including a list of switches and the connection between the switches) to perform part of the processing job.

In some embodiments, the processing job is a reduction and aggregation process in which selected in-network compute-resources perform parts of the reduction and aggregation process. In some embodiments, the processing job is a multicast process in which the selected in-network compute-resources perform respective parts of the multicast process.

The request from the software application may include one or more resource requirements of the processing job and the endpoint devices assigned to perform the processing job. The resource requirements of the processing job may include any one or more of the following: a radix requirement of the selected in-network compute-resources; a height of a tree of the selected in-network compute-resources; a number of aggregation nodes; a bandwidth requirement; a latency requirement; a buffer space requirement; a type of computation to be performed; and computing floating point numbers.

The state of the in-network compute-resources is maintained by the system and may indicate any one or more of the following: usage of ingress ports by processing jobs; use of switch bandwidth by processing jobs; switch compute resource latency; use of switch compute resource processing power by processing jobs; and use of switch buffers by processing jobs.

In some embodiments, the system selects the in-network compute-resources based on any one or more of the following: usage of ingress ports by processing jobs; use of switch bandwidth by processing jobs; switch compute resource latency; use of switch compute resource processing power by processing jobs; use of switch buffers by processing jobs; and the needs of the reduction and aggregation method, e.g., Scalable Hierarchical Aggregation and Reduction Protocol (SHARP™) In the above manner, the in-network compute-resources are selected without selecting from a selection of in-network compute resource trees generated prior to receiving the request, without selecting a tree of in-network compute-resources from a selection of in-network compute resource trees generated prior to receiving the request, without pruning a tree of in-network compute-resources generated prior to receiving the request, and/or without pruning a selection of in-network compute-resources.

Embodiments of the present invention overcome at least some of the shortcomings previously mentioned because the allocation of in-network compute-resources allocation to each application is tailor-built for that application, and may therefore be arbitrarily performed according to the application's needs. Additionally, the need to generate a massive amount of pre-generated trees is completely avoided. Moreover, managing mutual exclusion between allocations, as well as topology updates, is performed directly.

System Description

Figure 1:
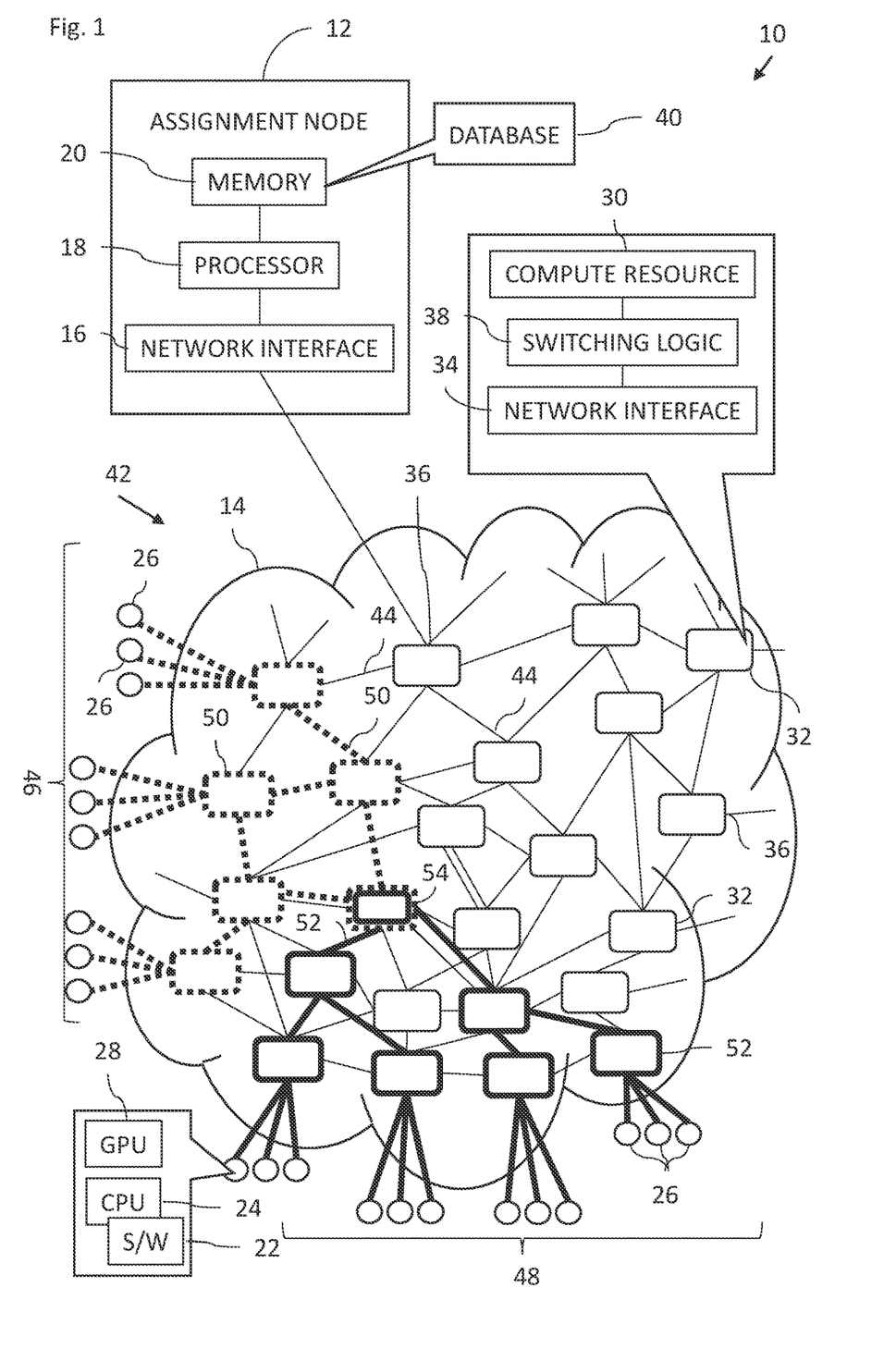
FIG. 1 is a block diagram view of an in-network compute-resource assignment system constructed and operative in accordance with an embodiment of the present invention.

Reference is now made to FIG. 1, which is a block diagram view of an in-network compute-resource assignment system 10 constructed and operative in accordance with an embodiment of the present invention.

The system 10 includes an assignment node 12, which may be a server node in a network 14. The assignment node 12 includes a network interface 16, a processor 18, and a memory 20. The network interface 16 is configured to receive a request generated by a software application 22 (or a job scheduler) to select resources to perform a processing job. The software application 22 may be running on a central processing unit (CPU) 24 of an endpoint device 26. In some embodiments, the software application 22 is a user application, which may handle tasks for one or more end users.

The term "user application" as used in the specification and claims is an application that belongs to a single entity (human or machine) which may be a computer (e.g., supercomputer) that wants to process a job, e.g., multiplying matrices. The user sends a request to a job scheduler (not shown), regarding the job requirements and the job scheduler manages the request and may obtain resources to run the job on behalf of the user application. The job scheduler is part of the administrator function, while the user requests the job. The job may include multiple processes.

The endpoint device 26 may also include processing elements such as a CPU (not shown) and/or a graphics processing unit (GPU) 28 and/or an application specific integrated circuit (ASIC) and/or an accelerator and/or a Field Programmable Gate Array (FPGA) and/or Tensor Processing Unit (TPU). The system 10 also includes other endpoint devices 26 that include CPUs and optionally GPUs (not shown). For the sake of simplicity only some of the endpoint devices 26 are labeled.

The processor 18 selects in-network compute-resources 30 to fulfill the request as described in more detail below. In some embodiments, the processing job is a reduction and aggregation process in which the selected in-network compute-resources 30 perform respective parts of the reduction and aggregation process. In some embodiments, the end point devices 26 include graphics processing units and/or CPUs and/or other processing elements assigned to perform part of the processing job. In some embodiments, the processing job includes a multicast process in which selected in-network compute-resources 30 perform respective parts of the multicast process.

The in-network compute-resources 30 may include any suitable in-network compute-resources. In the example of FIG. 1, the in-network compute-resources 30 are included in network switches 32 (only some labeled for the sake of simplicity). Each network switch 32 may include the in-network compute-resource 30, a network interface 34 (including a plurality of ports 36 of which one or more may be configured as ingress and/or egress ports), and switching logic 38 to forward packets received by the network switch 32 to one of the egress ports of that switch according to forwarding tables, for example.

The request generated by the software application 22 may include one or more resource requirements of the processing job and a list of the end point devices 26 assigned to perform the processing job. In some embodiments, the resource requirement(s) of the processing job includes one or more of the following: a radix requirement of the selected in-network compute-resources 30; a height of a tree of the selected in-network compute-resources 30; a number of aggregation nodes in the processing job; a bandwidth requirement (i.e. a minimum/maximum bandwidth required by the job per in-network compute-resource 30); a latency requirement (i.e. a minimum/maximum latency required by the job per in-network compute-resource 30); a buffer space requirement (i.e. a minimum/maximum buffer space required by the job per in-network compute-resource 30); a type of computation to be performed; and computing floating point numbers. The requirement regarding floating point numbers may be more relevant when "mixed precision" is used. If mixed precision is not being used, the processor 18 may need to consider which switches support floating point numbers. When mixed precision is used, the input width may be small, such as 16 bits, and the width of the computation increases, e.g., to 19 or 32 bits. In such a manner, the output width may exceed given limits (e.g., over wire speed). When mixed precision is going to be used, this has implications for the way that the switches are connected to be appropriate for mixed precision.

The memory 20 is configured to store a database 40 of a state of the in-network compute-resources 30 indicating resource usage of the in-network compute-resources 30 by other processing jobs. The state may indicate any one or more of the following: usage of ingress ports (per switch) by processing jobs; use of switch bandwidth (per switch) by processing jobs; latency (per switch); use of switch compute resource processing power (per switch) by processing jobs; and use of switch buffers (per switch) by processing jobs.

The processor 18 is configured to manage the state stored in the database 40. The processor 18 is configured to update the state of the in-network compute-resources 30 responsively to: receiving the request to select resources 30 to perform the processing job (to allocate resources used by the processing job in the state); and completion of the processing job (to free up allocated resources when the processing job completes processing).

The processor 18 is configured, responsively to receiving the request, to select ones of the in-network compute-resources 30 to perform the processing job based on: (a) a network topology of the network 14 including the in-network compute-resources 30; (b) the state of the in-network compute-resources (as stored in the database 40); and (c) the resource requirement(s) of the processing job. In some embodiments, the processor 18 is configured to select the selected in-network compute-resources 30 based on requirements of the reduction and aggregation protocol (e.g., SHARP) according to which the processing job is run. Examples of the selection process are provided below in disclosed embodiments.

In some embodiments, the processor 18 is configured to select the in-network compute-resources 30 to perform the processing job based on the state of the in-network compute-resources 30 as stored in the database 40 and any one or more of the following (included in the database 40): usage of ingress ports (per switch) by processing jobs; use of switch bandwidth (per switch) by processing jobs; latency (per switch); use of switch compute resource processing power (per switch) by processing jobs; and use of switch buffers by processing jobs.

As previously mentioned, in some embodiments, the in-network compute-resources 30 are included in the network switches 32 connected according to a network topology 42 using network connections 44 (only some labeled for the sake of simplicity). Therefore, in some embodiments, the processor 18 is configured to select from network switches 32 to perform the processing job based on: the network topology (i.e., the placement of the network switches 32 in the network 14 and the network connections 44 between the network switches 32); a state of the network switches 32 (as stored in the database 40); the resource requirement of the processing job; and the endpoint devices 26 assigned to perform the processing job.

In some embodiments, the processor 18 is configured to select the in-network compute-resources 30 (including the network switches 32 and the network connections 44) that will participate in the processing job so that the selected in-network compute-resources 30 form a tree (e.g., spanning tree), for example, extending from the endpoint devices 26 participating in the processing job up to a root switch. In some embodiments, the processor 18 is configured to select the in-network compute-resources 30 which best meet the requirements of the processing job based on the position of the endpoint devices 26 participating in the job and the in-network compute-resources 30 (e.g., in the network switches 32) neighboring the endpoint devices 26 participating in the job. The processor 18 may examine the processing abilities (including bandwidth, latency, free buffer space etc. of the in-network compute-resources 30 and/or network switches 32) and the state of the in-network compute-resources 30 (stored in the database 40) within X hops of the endpoint devices 26 participating in the jobs, for example, and then select the in-network compute-resources 30 that best meet the requirements of the processing job. The processor 18 may use a suitable optimization algorithm to perform the selection. In some embodiments, the processor 18 may build the tree by checking the processing abilities (including bandwidth, latency, free buffer space etc. of the in-network compute-resources 30 and/or network switches 32) and the state of the in-network compute-resources 30 (stored in the database 40) for each in-network compute-resource 30 and/or network switch 32 where there is a choice between different in-network compute-resources 30 and/or network switches 32 and then choose the best option. For example, the network switches 32 (in the initial level of the tree) directly connected to the respective endpoint devices 26 participating in the processing job may be the only choices available as each endpoint device 26 is generally (but not always) only directly connected to one network switch 32. Above the initial level of network switches 32, the processor 18 may be configured to select which of the network switches 32 should be in the selected tree based on the processing abilities (including bandwidth, latency, free buffer space etc. of the in-network compute-resource 30 and/or network switch 32) and the state of the in-network compute-resource 30 (stored in the database 40). The selection process is described in more detail with reference to FIGS. 2-5 below.

Therefore, the processor 18 is configured to select the in-network compute-resources 30 without selecting from a selection of in-network compute resource trees generated prior to receiving the request. The processor 18 is configured to select the in-network compute-resources without selecting a tree of in network compute-resources from a selection of in-network compute resource trees generated prior to receiving the request. The processor 18 is configured to select the in-network compute-resources without pruning a tree of in-network compute-resources generated prior to receiving the request. The processor 18 is configured to select the in-network compute-resources without pruning a selection of in-network compute-resources.

As previously mentioned, the processor 18 may select the network switches 32 and the network connections 44 to use for a given processing job. For example, if two processing jobs are using two of the same network switches 32, different network connections 44 connecting the two network switches 32 may be selected for each of the processing jobs where available. Therefore, another advantage of ad-hoc selection of in-network compute-resources 30 in response to receiving the request from the software application 22 is that any of the available network connections 44 (even when there are multiple network connections 44 between the same network switches 32) may be selected for use, whereas pre-generated trees (pre-generated prior to receiving the request) cannot consider all the different permutations and combinations of network switches 32 and network connections 44.

FIG. 1 shows two groups of endpoint device 26 participating in two different processing jobs. The endpoint devices 26 in a group 46 are participating in processing job A, and the endpoint device 26 in a group 48 are participating in processing job B. The processor 18 is configured to select a tree of network switches 32 including in-network compute-resources 30 (and the network connections 44) for processing job A and a tree of network switches 32 including in-network compute-resources 30 for processing job B. FIG. 1 shows the network switches 32 and network connections 44 selected for processing job A using dotted lines (for example the lines and switches labeled 50—only some labeled for the sake of simplicity). FIG. 1 shows the network switches 32 and network connections 44 selected for processing job B using solid thicker lines (for example the lines and switches labeled 52—only some labeled for the sake of simplicity). FIG. 1 also shows that a root node 54 of both trees is the same network switch 32.

Figure 2:
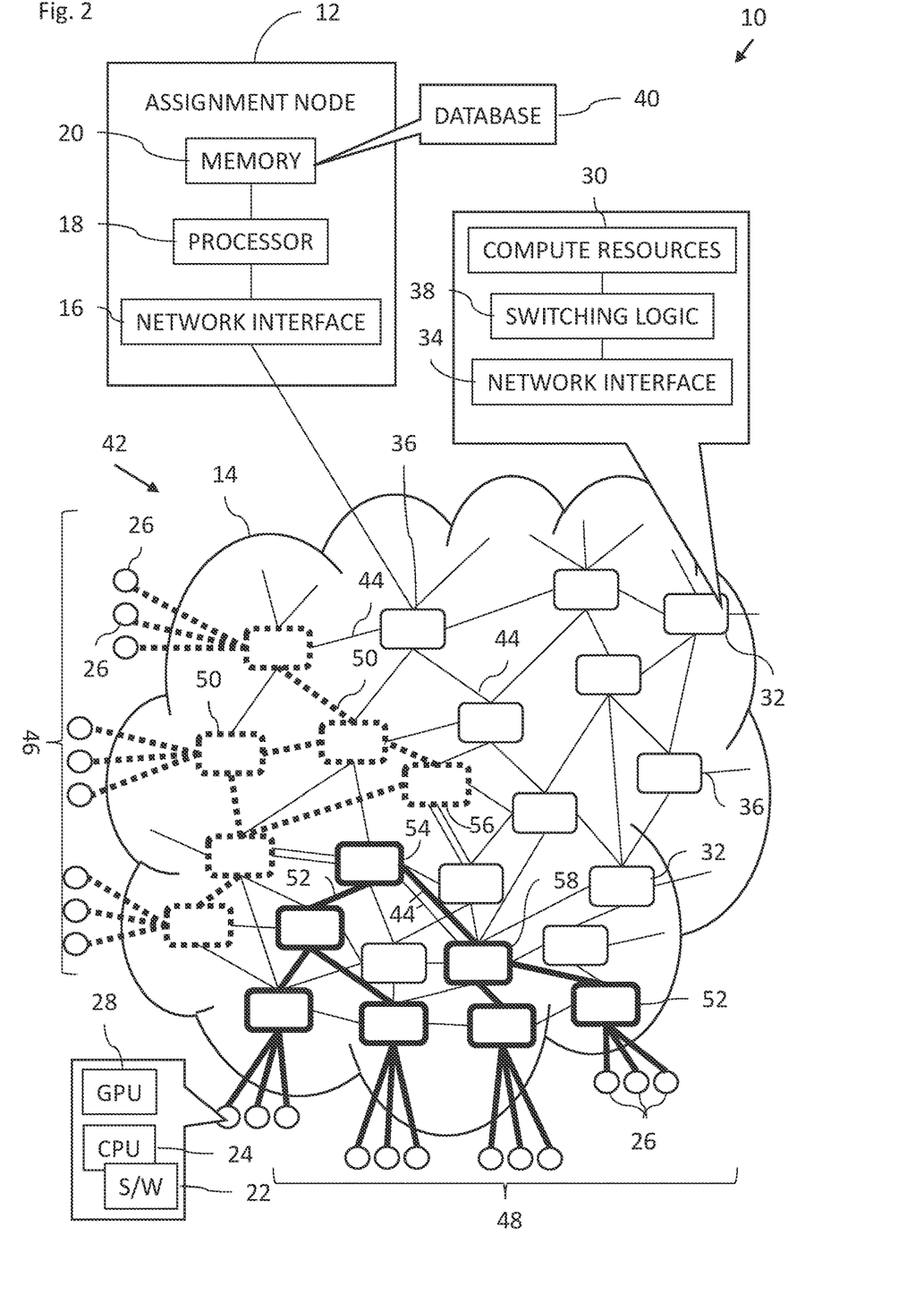
FIG. 2 is a block diagram view of the system of FIG. 1 illustrating two non-overlapping in-network compute-resource trees.

Reference is now made to FIG. 2, which is a block diagram view of the system 10 of FIG. 1 illustrating two non-overlapping in-network compute-resource trees. FIG. 2 shows that the network switches 32 and the network connections 44 selected for processing job A and B are substantially the same as shown in FIG. 1 except that the tree of network switches 32 for processing job A and the tree of network switches 32 for processing job B do not overlap even at the root node. In FIG. 2, the root node 54 is still the root node of the tree of network switches 32 for processing job B, while a root node 56 is the root node of the tree of network switches 32 for processing job A. FIG. 2 also shows that there are two network connections 44 between one of the switches (labeled 58) and the root node 54. FIG. 2 shows that the processor 18 selected one of the network connections 44 between the switch (labeled 58) and the root node 54.

FIG. 1 provides an example where trees of network switches 32 overlap with a particular switch 54, whereas FIG. 2 shows that none of the selected network switches 32 overlap. For example, processing job A needs high bandwidth (without low latency) and processing job B needs low latency (without high bandwidth), both jobs may run on the same switch as shown in FIG. 1 as the shared switch 54 can provide the required bandwidth and latency for both jobs. However, where both jobs require more resources than one switch can provide (e.g., in terms of bandwidth, latency, processing power, or buffer space) then the processor 18 would avoid assigning the same switch to two or more processing jobs as shown in FIG. 2.

Regarding bandwidth, the bandwidth used by the endpoint devices 26 and the bandwidth of the network connections 44 may be considered by the processor 18, for example, if it is envisioned that bandwidth capacity may be reached. For example, if two reduction operations use 100 Gigabits per second (Gb/s) and the network connections 44 have a limit of 200 Gb/s then both reduction operations can run over the same network connection(s) 44. However, if there is a third processing job, the processor 18 is configured to find different network connection(s) 44 for the third job to use.

Figure 3:
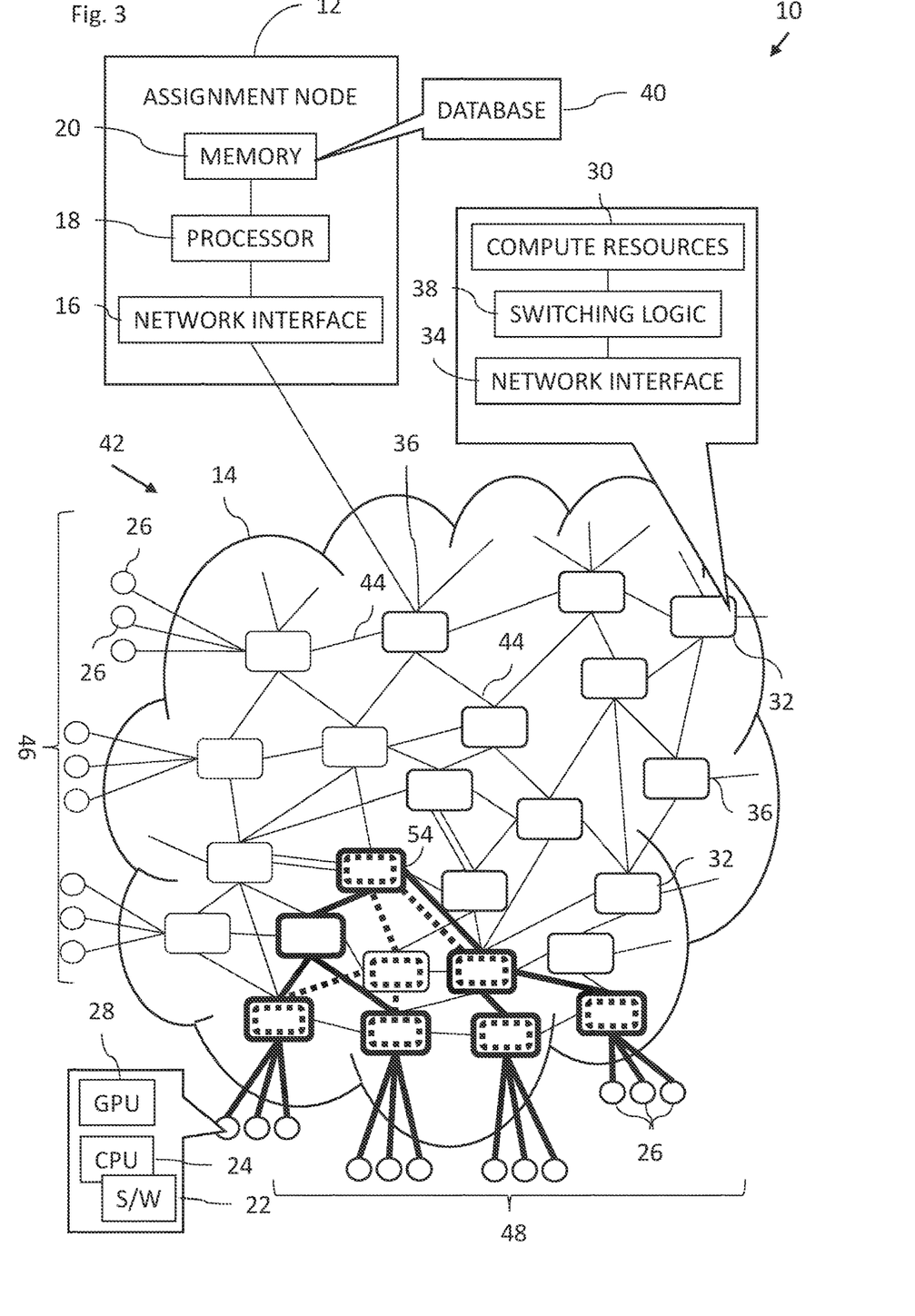
FIG. 3 is a block diagram view of the system of FIG. 1 illustrating two alternative in-network compute-resource trees for a processing job.

Reference is now made to FIG. 3, which is a block diagram view of the system 10 of FIG. 1 illustrating two alternative in-network compute-resource trees for a processing job. FIG. 3 shows two possible alternate trees for a processing job for the group 48 of the endpoint devices 26. FIG. 3 shows the network switches 32 and network connections 44 selected for one of the possible trees for processing job B using dotted lines. FIG. 3 also shows the network switches 32 and network connections 44 selected for processing job B using solid thicker lines. FIG. 3 also shows that the root node 54 of both trees is the same network switch.

Figure 4:
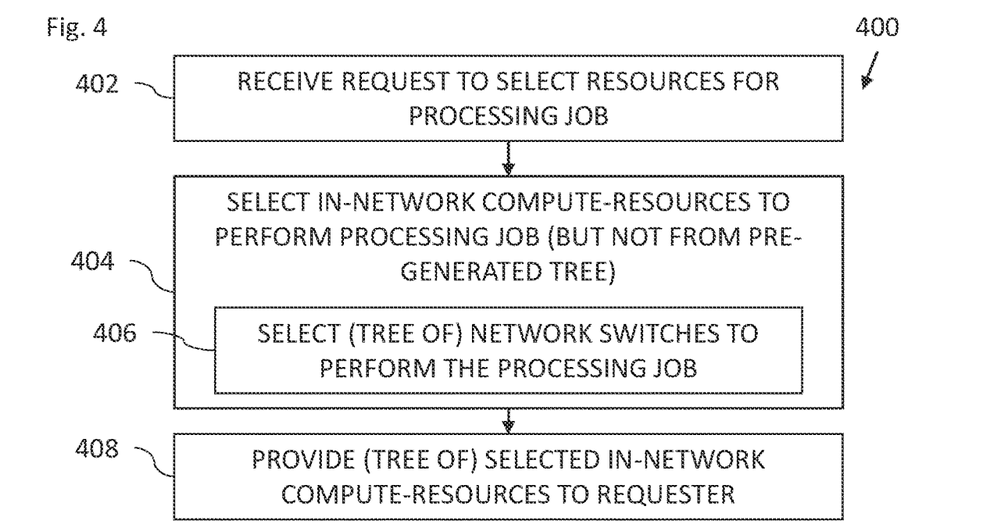
FIG. 4 is a flowchart including steps in a method of operation of the system of FIG. 1.

Reference is now made to FIG. 4, which is a flowchart 400 including steps in a method of operation of the system 10 of FIG. 1. The network interface 16 is configured to receive a request generated by the software application 22 to select resources to perform a processing job. The request includes one or more resource requirements of the processing job and end point devices 26 assigned to perform the processing job (block 402).

The processor 18 is configured, responsively to receiving the request, to select in-network compute-resources (from the available in-network compute-resources 30) to perform the processing job based on: (a) the network topology 42 of the network 14 including the in-network compute-resources 30; (b) the state of the in-network compute-resources 30 as stored in the database 40; (c) the resource requirement(s) of the processing job; and (d) the endpoint devices 26 assigned to perform the processing job (block 404). In some embodiments, the processor 18 is configured to select network switches 32 from the available network switches 32 in the network 14 to perform the processing job based on: the network topology 42; a state of the network switches 32; and the resource requirement(s) of the processing job, and the endpoint devices 26 assigned to perform the processing job. In some embodiments, the processor 18 is configured to select a tree of the selected network switches 32 and network connections 44 between the selected network switches 32 (block 406).

In some embodiments the processor 18 is configured to provide (a tree of) the selected in-network compute-resources 30 (optionally including selected network switches 32 and network connections 44) to the endpoint device 26 which provided the request (block 408).

Figure 5:
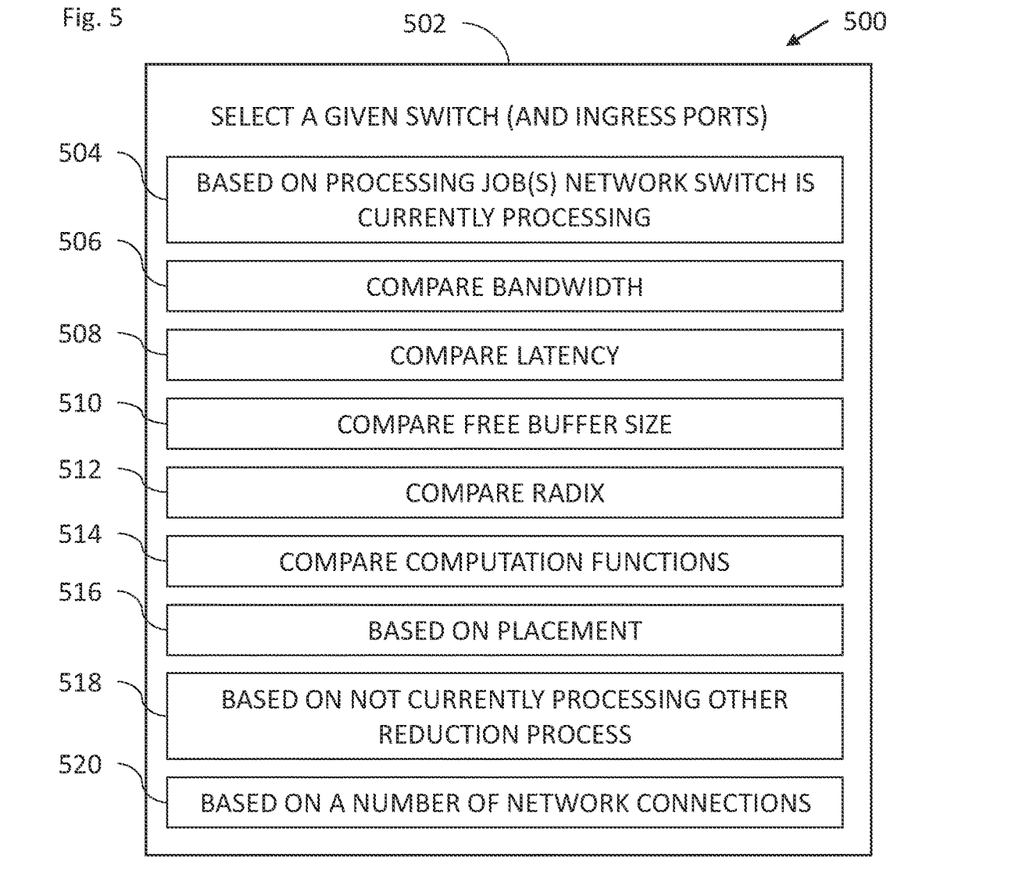
FIG. 5 is a flowchart including steps in a method of selecting a switch in the system of FIG. 1.

Reference is now made to FIG. 5, which is a flowchart 500 including steps in a method of selecting one of the network switches 32 in the system 10 of FIG. 1. The processor 18 is configured to select a given network switch 32 and or an ingress port of that network switches 32 to use for the processing job (block 502).

In some embodiments, the processor 18 is configured to select the given network switch 32 based on one or more other processing jobs that the given network switch is currently processing (block 504). For example, if the processing job requires a given bandwidth, latency, buffer size, and/or processing power etc., and the other processing jobs currently using that switch 32 already use one or more of those resources, then that switch may be avoided in the selection process.

In some embodiments, the processor 18 is configured to select ingress ports of the selected network switches 32 through which to ingress packets of the processing job. For a given network switch 32, the processor 18 is configured to select a given ingress port of the given selected network switch through which to ingress packets of the processing job based on one or more processing jobs that the given ingress port is currently supporting. In other words, if the given ingress port can support the processing job based on the other processing jobs also using that ingress port, then that ingress port may be selected for use. If the given ingress port cannot support the processing job based on the other processing jobs also using that ingress port, then that ingress port may be avoided in the selection process. In accordance with some reduction and aggregation protocols two reduction processes do not use the same ingress port concurrently.

The processor 18 is configured to select a given one of the network switches 32 based on comparing any one or more of the following:
- a bandwidth resource of the given network switch 32 and bandwidth requirements of the processing job for which the request was received and the other processing job(s) that the given network switch 32 is currently processing (block 506);
- a latency of the given network switch 32 and latency requirements of the processing job for which the request was received and the other processing job(s) that the given network switch 32 is currently processing (block 508);
- a free buffer size of the given network switch 32 and buffering requirements of the processing job for which the request was received and the other processing job(s) that the given network switch 32 is currently processing (block 510);
- a radix of the given network switch and radix requirements of the processing job (block 512); and
- computational functions of the given network switch 32 and computational requirements of the processing job (block 514). For example, if the processing job requires given computational requirements that the network switches 32 can perform then the network switch 32 may be selected (subject to the other factors mentioned above). The above factors may be considered individually, or jointly and different weights may be assigned to the factors by the software application 22 or the processor 18 in order to make a decision regarding selection of a given one of the network switches 32.

In some embodiments, the processor 18 is configured to select a given one of the network switches 32 based on a placement in the network 14 of the given network switch (block 516). For example, the selected network switches generally form a tree extending from the endpoint devices 26 participating in the processing job to a root node. Therefore, the placement of the selected network switches 32 may be limited in the number of hops from the endpoint devices 26 participating in the processing jobs, the job requirements regarding the height of the tree, and the network connections 44 between network switches 32.

In some embodiments, the processor 18 is configured to select a given one of the network switches 32 based on the given network switch not currently processing any other reduction processes (block 518). It is generally better to select a switch not being used by other processing jobs to maximize switch resources (such as bandwidth, buffer space, and/or processing power) and minimize latency for the processing job.

In some embodiments, the processor 18 is configured to select the selected network switches based on a number of network connections 44 between the selected network switches (block 520). Switches with more network connections between nodes may prevent traffic bottlenecks for the processing jobs using the same pair of switches connected via multiple network connections 44.

In practice, some or all of the functions of the processor 18 may be combined in a single physical component or, alternatively, implemented using multiple physical components. These physical components may comprise hard-wired or programmable devices, or a combination of the two. In some embodiments, at least some of the functions of the processor 18 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system, comprising:
   a network interface to receive a request to select resources to perform a processing job, wherein the request includes:
     at least one resource requirement of the processing job; and
     an identification of end point devices assigned to perform the processing job;
   a memory to store a state of in-network compute-resources indicating resource usage of the in-network compute-resources by other processing jobs; and
   a processor to:
     manage the stored state; and
     responsively to receiving the request, select ones of the in-network compute-resources to perform the processing job based on: (a) a network topology of a network including the in-network compute-resources; (b) the state of the in-network compute resources; and (c) the at least one resource requirement of the processing job,
   wherein: the in-network compute resources are included in network switches connected according to the network topology; and the processor is to select ones of the network switches to perform the processing job based on:
     the network topology;
     a state of the network switches; and
     the at least one resource requirement of the processing job.

2. The system according to claim 1, wherein the request is generated by a job scheduler, or a software application, which is a user application.

3. The system according to claim 1, wherein the processor is to select the ones of the in-network compute-resources without selecting from a selection of in-network compute resource trees generated prior to receiving the request.

4. The system according to claim 1, wherein the processor is to select the ones of the in-network compute-resources without selecting a tree of in network compute-resources from a selection of in-network compute resource trees generated prior to receiving the request.

5. The system according to claim 1, wherein the processor is to select the ones of the in-network compute-resources without pruning a tree of in-network compute resources generated prior to receiving the request.

6. The system according to claim 1, wherein the processor is to select the ones of the in-network compute-resources without pruning a selection of in-network compute resources.

7. The system according to claim 1, wherein the processor is to select a tree of the selected network switches and network connections between the selected network switches.

8. The system according to claim 1, wherein the processor is to select a given one of the network switches based on at least one other processing job that the given network switch is currently processing.

9. The system according to claim 1, wherein the processor is to select a given one of the network switches based on comparing any one or more of the following:
   a bandwidth resource of the given network switch and bandwidth requirements of at least one other processing job that the given network switch is currently processing and the processing job;
   a latency of the given network switch and latency requirements of the at least one other processing job that the given network switch is currently processing and the processing job;
   a free buffer size of the given network switch and buffering requirements of the at least one other processing job that the given network switch is currently processing and the processing job;
   a radix of the given network switch and radix requirements of the processing job; and
   computational functions of the given network switch and computational requirements of the processing job.

10. The system according to claim 1, wherein the processor is to select a given one of the network switches based on a placement in the network of the given network switch.

11. The system according to claim 1, wherein the processor is to select a given one of the network switches based on the given network switch not currently processing any other reduction processes.

12. The system according to claim 1, wherein the processor is to select ingress ports of the selected network switches through which to ingress packets of the processing job.

13. The system according to claim 1, wherein the processor is to select a given ingress port of one of the selected network switches through which to ingress packets of the processing job based on at least one other processing job that the given ingress port is currently supporting.

14. The system according to claim 1, wherein the processor is to select the selected network switches based on a number of network connections between the selected network switches.

15. The system according to claim 1, wherein the end point devices include graphics processing units assigned to perform part of the processing job.

16. The system according to claim 1, wherein the at least one resource requirement of the processing job includes one or more of the following: a radix requirement of the selected in-network compute-resources; a height of a tree of the selected in-network compute-resources; a number of aggregation nodes; a bandwidth requirement; a latency requirement; a buffer space requirement; a type of computation to be performed; and computing floating point numbers.

17. The system according to claim 1, wherein the processing job is a reduction and aggregation process in which the selected in-network compute-resources perform respective parts of the reduction and aggregation process.

18. The system according to claim 17, wherein the processor is to select the selected in-network compute-resources based on requirements of a reduction and aggregation protocol.

19. The system according to claim 1, wherein the processor is to update the state of the in-network compute-resources responsively to:
   receiving the request to select resources to perform the processing job; and
   completion of the processing job.

20. The system according to claim 1, wherein the processing job is a multicast process in which the selected in-network compute-resources perform respective parts of the multicast process.

21. A system, comprising:
   a network interface to receive a request to select resources to perform a processing job, wherein the request includes:
      at least one resource requirement of the processing job; and
      an identification of end point devices assigned to perform the processing job;
   a memory to store a state of in-network compute-resources indicating resource usage of the in-network compute-resources by other processing jobs; and
   a processor to:
      manage the stored state; and
      responsively to receiving the request, select ones of the in-network compute-resources to perform the processing job based on: (a) a network topology of a network including the in-network compute-resources; (b) the state of the in-network compute resources; and (c) the at least one resource requirement of the processing job,
   wherein the processor is to update the state of the in-network compute-resources responsively to:
   receiving the request to select resources to perform the processing job; and
   completion of the processing job, and wherein:
   the state indicates any one or more of the following: usage of ingress ports by processing jobs; use of switch bandwidth by processing jobs; switch compute resource latency; use of switch compute resource processing power by processing jobs; and use of switch buffers by processing jobs; and
   the processor is to select the selected in-network compute-resources based on the state of the in-network compute resources and any one or more of the following: usage of ingress ports by processing jobs; use of switch bandwidth by processing jobs; switch compute resource latency; use of switch compute resource processing power by processing jobs; and use of switch buffers by processing jobs.

22. A method, comprising:
   receiving a request to select resources to perform a processing job, the request including: at least one resource requirement of the processing job; and an identification of end point devices assigned to perform the processing job;
   managing a state of in-network compute-resources indicating resource usage of the in-network compute-resources by other processing jobs; and
   responsively to receiving the request, selecting ones of the in-network compute-resources to perform the processing job based on:
      a network topology of a network including the in-network compute-resources;

the state of the in-network compute resources; and
the at least one resource requirement of the processing job,
wherein: the in-network compute-resources are included in network switches connected according to the network topology; and the processor is to select ones of the network switches to perform the processing job based on:
the network topology;
a state of the network switches; and
the at least one resource requirement of the processing job.

\* \* \* \* \*